No. 693,360. Patented Feb. 18, 1902.
W. G. BAHL.
ICE CREAM DISHER.
(Application filed June 21, 1901.)
(No Model.)
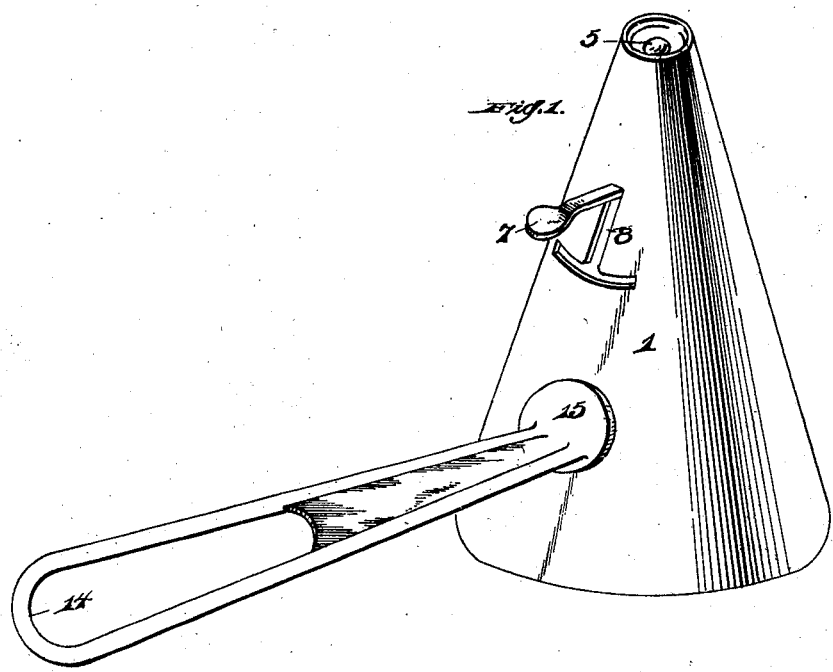
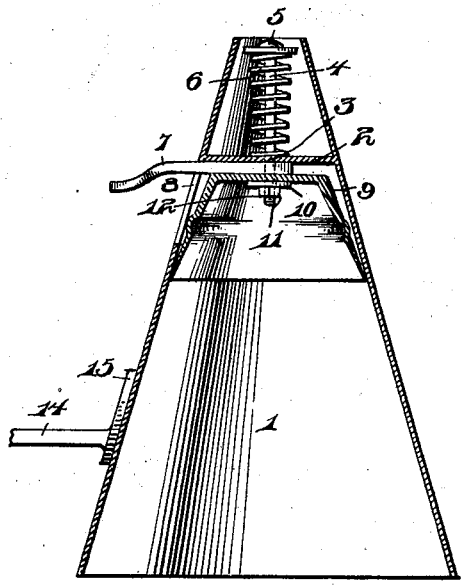
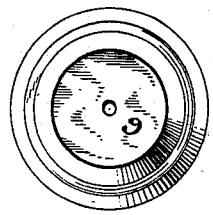
Witnesses:
J. P. Appleman
S. D. Goddon
Inventor
W. G. Bahl
By O. D. Levis
Atty.

UNITED STATES PATENT OFFICE.

WILLIAM G. BAHL, OF PITTSBURG, PENNSYLVANIA.

ICE-CREAM DISHER.

SPECIFICATION forming part of Letters Patent No. 693,360, dated February 18, 1902.

Application filed June 21, 1901. Serial No. 65,451. (No model.)

*To all whom it may concern:*

Be it known that I, WILLIAM G. BAHL, a citizen of the United States of America, residing at Pittsburg, in the county of Allegheny and State of Pennsylvania, have invented certain new and useful Improvements in Ice-Cream Dishers; and I do hereby declare the following to be a full, clear, and exact description thereof, reference being had to the accompanying drawings, which form a part of this specification.

This invention relates to certain new and useful improvements in ice-cream dishers, and more particularly to that class that may be easily operated with one hand.

The invention has for its object the provision of novel means whereby portions of ice-cream or the like may be easily served and disengaged from the mold.

The herein-described invention consists in the novel combination and arrangement of parts to be hereinafter more fully described, and specifically pointed out in the claims.

In describing the invention in detail reference is had to the accompanying drawings, forming a part of this specification, wherein like numerals of reference indicate corresponding parts throughout the several views, and in which—

Figure 1 is a perspective view of my improved ice-cream disher. Fig. 2 is a vertical sectional view of the cone-shaped mold. Fig. 3 is a side elevation of the interior cap. Fig. 4 is a top plan view of the interior cap. Fig. 5 is a perspective view of the operating-handle.

In the drawings the reference-numeral 1 indicates the cone-shaped mold, having arranged in the apex of the cone a partition 2. A central aperture 3 is formed in said partition, which aperture is adapted to receive a rod 4, carrying a head 5. A spiral spring 6 encircles said rod between the head 5 and the upper face of the partition 2. An operating-handle 7 is also secured upon the rod 4 and extends through the inverted-T-shaped opening 8, arranged in the wall of the mold 1. The cup-shaped cap 9 is rigidly secured by means of the washer 10 and securing-nut 11, adapted to engage the screw-threaded end 12 of the rod 4, which serves to fasten the cup-shaped cap in the mold. The reference-numeral 14 represents the handle of the disher, which is rigidly secured at 15 to the mold.

The manner of operating my improved ice-cream disher is as follows: The handle 14 is grasped and the ice-cream may be then scooped out of the freezer, filling the mold. The thumb or forefinger may then be employed to depress the operating-handle 7, which will operate the cup-shaped cap and cause it to disengage the ice-cream from the interior walls of the mold. When the operating-handle 7 is depressed to its limit in the inverted-T-shaped slot, it may then be operated laterally to give the ice-cream a partially rotary movement, which will also serve to disengage the cream from the interior of the mold. The operating-handle 7 is then turned to engage the upwardly-extending portion of the slot, and the spring 6 will serve to return the same to its normal position, as shown in Fig. 1 of the drawings. It will be apparent that the blades or knives usually employed in this class of inventions to disengage the cream from the interior walls of the mold are entirely dispensed with and that the mechanism herein described is simple and effectual and the parts constructed in such a manner that the same will not become out of order.

The many advantages obtained by the use of my improved disher will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a disher of the character described, the combination of a cone-shaped mold, a partition formed in the apex of said mold, a spring-pressed rod extending through said partition, a cup-shaped cap secured to said rod, an operating-handle attached to said rod extending through said cone-shaped mold, and a handle rigidly secured to said mold, substantially as herein shown and described.

2. In an ice-cream disher, the combination with a cone-shaped mold having an inverted-T-shaped slot formed therein, a partition formed in the apex of said mold, a spring-pressed rod extending through said partition, a cup-shaped cap secured to said rod, an operating-handle attached to said rod extending through said inverted-T-shaped slot, and a handle rigidly secured to said mold, all parts being arranged and operating substantially as herein shown and described.

In testimony whereof I have hereunto affixed my signature in the presence of two subscribing witnesses.

WILLIAM G. BAHL.

Witnesses:
LOUIS MOESER,
S. S. GODDON.